United States Patent
Tanouchev et al.

(10) Patent No.: US 9,131,071 B2
(45) Date of Patent: Sep. 8, 2015

(54) BINDING OF SD MESSAGES WITH RADIUS MESSAGES

(71) Applicant: ALCATEL-LUCENT CANADA INC., Ottawa (CA)

(72) Inventors: Ivaylo Tanouchev, Ottawa (CA); Matthew Yee, Kanata (CA); Shanawaz Shaik, Ottawa (CA); Kugendran Sabaratnam, Kanata (CA)

(73) Assignee: Alcatel Lucent, Boulogne-Billancourt (FR)

( * ) Notice: Subject to any disclaimer, the term of this patent is extended or adjusted under 35 U.S.C. 154(b) by 291 days.

(21) Appl. No.: 13/893,723

(22) Filed: May 14, 2013

(65) Prior Publication Data

US 2014/0342690 A1    Nov. 20, 2014

(51) Int. Cl.
  *H04W 4/26* (2009.01)
  *H04M 15/00* (2006.01)
  *H04W 4/24* (2009.01)

(52) U.S. Cl.
  CPC ............... *H04M 15/66* (2013.01); *H04W 4/24* (2013.01)

(58) Field of Classification Search
  CPC ............ H04W 4/24; H04W 4/26; H04W 8/20
  USPC .......................................... 455/405, 406, 408
  See application file for complete search history.

(56) References Cited

U.S. PATENT DOCUMENTS

| | | | |
|---|---|---|---|
| 6,675,208 B1 * | 1/2004 | Rai et al. ....................... | 709/224 |
| 7,136,631 B1 * | 11/2006 | Jiang et al. ................. | 455/414.1 |
| 7,336,941 B1 * | 2/2008 | Clingerman et al. ...... | 455/404.1 |
| 7,471,634 B1 * | 12/2008 | Wenzel et al. ................ | 370/241 |
| 8,072,990 B1 * | 12/2011 | Tuvell et al. .................. | 370/401 |
| 2004/0048600 A1 * | 3/2004 | Madour et al. ................ | 455/408 |
| 2004/0102182 A1 * | 5/2004 | Reith et al. .................... | 455/410 |
| 2004/0202145 A1 * | 10/2004 | Lundin ......................... | 370/349 |
| 2014/0164633 A1 * | 6/2014 | Bi et al. ........................ | 709/227 |

* cited by examiner

*Primary Examiner* — Christopher M Brandt
(74) *Attorney, Agent, or Firm* — Kramer & Amado, P.C.

(57) ABSTRACT

Various exemplary embodiments relate to a method performed by a policy and charging rules node (PCRN), the method including: receiving a RADIUS accounting request (ACR) start message from a network access server (NAS); establishing a RADIUS session with the NAS; applying rules by a rules engine to information in the ACR start message to determine a traffic detection function (TDF) to be updated; establishing a Sd session with the TDF; and binding the Sd session to the RADIUS session.

18 Claims, 3 Drawing Sheets ical FIELD

BINDING OF SD MESSAGES WITH RADIUS MESSAGES

TECHNICAL FIELD

Various exemplary embodiments disclosed herein relate generally to communication networks.

BACKGROUND

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks, leading to a less-than-elegant solution. As seen in second and third generation networks, voice services must be carried over dedicated voice channels and directed toward a circuit-switched core, while other service communications are transmitted according to the Internet Protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other in a number of technical specifications, including the following components: Policy and Charging Rules Function (PCRF) implemented in a Policy and Charging Rules Node (PCRN); Policy and Charging Enforcement Function (PCEF) implemented in a Policy and Charging Enforcement Node (PCEN); and Bearer Binding and Event Reporting Function (BBERF) of the EPC. These specifications further provide some guidance as to how these elements interact in order to provide reliable data services and charge subscribers for use thereof.

Today LTE networks interact and interface with traditional wired networks. Such networks may include network access servers (NAS) that connect the wired network to the LTE network. Further, the wired network may include a traffic detection function (TDF). The TDF may analyze network traffic for monitoring, detection, billing, inspection, etc. The TDF may be implemented as a deep packet inspection (DPI) node. Also the TDF may be integrated into other nodes and provide traffic detections functionality along with the other functions of the node. The TDF may send traffic information to the NAS.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to method performed by a policy and charging rules node (PCRN), the method including: receiving a RADIUS accounting request (ACR) start message from a network access server (NAS); establishing a RADIUS session with the NAS; applying rules by a rules engine to information in the ACR start message to determine a traffic detection function (TDF) to be updated; establishing a Sd session with the TDF; and binding the Sd session to the RADIUS session.

Various exemplary embodiments relate to a non-transitory computer-readable storage medium encoded with instructions executable by a processor in a and charging rules node (PCRN), the non-transitory computer readable storage medium including: instructions for receiving a RADIUS accounting request (ACR) start message from a network access server (NAS); instructions for establishing a RADIUS session with the NAS; instructions for applying rules by a rules engine to information in the ACR start message to determine a traffic detection function (TDF) to be updated; instructions for establishing a Sd session with the TDF; and instructions for binding the Sd session to the RADIUS session.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
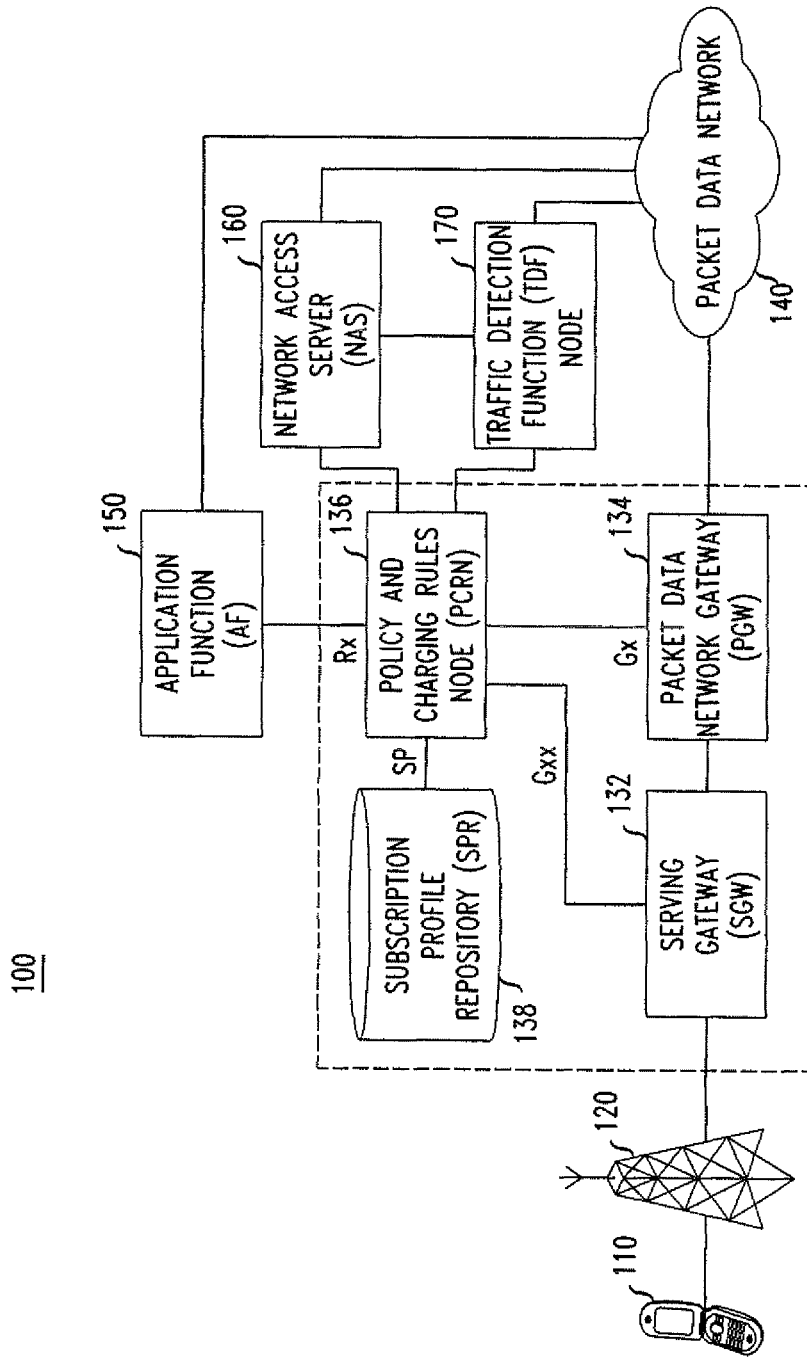
FIG. 1 illustrates an exemplary subscriber network for providing various data services.

FIG. 1 illustrates an exemplary subscriber network 100 for providing various data services. Exemplary subscriber network 100 may be a telecommunications network or other network for providing access to various services. Exemplary subscriber network 100 may include user equipment 110, base station 120, evolved packet core (EPC) 130, packet data network 140, application function (AF) 150, a network access server 160, and a traffic detection function node 170.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, tablet, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to various 3GPP standards. Accordingly, EPC 130 may include a serving gateway (SGW) 132, a packet data network gateway (PGW) 134, a policy and charging rules node (PCRN) 136, and a subscription profile repository (SPR) 138.

Serving gateway (SGW) 132 may be a device that provides gateway access to the EPC 130. SGW 132 may be the first device within the EPC 130 that receives packets sent by user equipment 110. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services.

Policy and charging rules node (PCRN) 136 may be a device or group of devices that receives requests for application services, generates PCC rules, and provides PCC rules to the PGW 134 and/or other PCENs (not shown). PCRN 136 may be in communication with AF 150 via an Rx interface. As described in further detail below with respect to AF 150, PCRN 136 may receive an application request in the form of an Authentication and Authorization Request (AAR) from AF 150. Upon receipt of AAR (not shown), PCRN 136 may generate at least one new PCC rule for fulfilling the application request.

PCRN 136 may also be in communication with SGW 132 and PGW 134 via a Gxx and a Gx interface, respectively. PCRN 136 may receive an application request in the form of a credit control request (CCR) (not shown) from SGW 132 or PGW 134. As with AAR, upon receipt of a CCR, PCRN may generate at least one new PCC rule for fulfilling the application request 170. In various embodiments, AAR and the CCR may represent two independent application requests to be processed separately, while in other embodiments, AAR and the CCR may carry information regarding a single application request and PCRN 136 may create at least one PCC rule based on the combination of AAR and the CCR. In various embodiments, PCRN 136 may be capable of handling both single-message and paired-message application requests.

Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creating a new QoS rule or upon request by the SGW 132, PCRN 136 may provide a QoS rule to SGW 132 via the Gxx interface.

The PCRN 136 may also communicate with the NAS 160 and the TDF 170, which will be described in further detail below.

The PCRN 136 may include network interfaces for communication with other network node, a PCC rule engine, and PCC rule storage. For example, the PCRN 136 may receive an OUT_OF_CREDIT trigger event via the network interface, and pass that event to the PCC rule engine for processing. The PCC rule engine may make decisions regarding existing rules and to create new rules based upon the trigger event. Any new rules or changes to rules may be noted in the PCC rule storage.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. Data stored by SPR 138 may include an identifier of each subscriber and indications of subscription information for each subscriber such as bandwidth limits, charging parameters, and subscriber priority.

Packet data network 140 may be any network for providing data communications between user equipment 110 and other devices connected to packet data network 140, such as AF 150. Packet data network 140 may further provide, for example, phone and/or Internet service to various user devices in communication with packet data network 140.

Application function (AF) 150 may be a device that provides a known application service to user equipment 110. Thus, AF 150 may be a server or other device that provides, for example, a video streaming or voice communication service to user equipment 110. AF 150 may further be in communication with the PCRN 136 of the EPC 130 via an Rx interface. When AF 150 is to begin providing known application service to user equipment 110, AF 150 may generate an application request message, such as an authentication and authorization request (AAR) according to the Diameter protocol, to notify the PCRN 136 that resources should be allocated for the application service. This application request message may include information such as an identification of the subscriber using the application service, an IP address of the subscriber, an APN for an associated IP-CAN session, and/or an identification of the particular service data flows that must be established in order to provide the requested service. AF 150 may communicate such an application request to the PCRN 136 via the Rx interface.

The network access server (NAS) 160 provides a single point access to a wireline network. Thus the connection between the NAS and the wireless network allows for direct interaction between the wireless network and the wireline network. Further, the NAS 160 may provide access to a protected network resource. The NAS 160 may connect to the PCRN 136 so that the PCRN 136 may provide policy control for various functions. The NAS 160 may connect to the TDF 170 and receive reports regarding various traffic that the TDF 170 is monitoring. Further, the NAS 160 may connect to the packet data network 140 that might provide, for example, internet access or connectivity to other communication networks.

The traffic detection function (TDF) 170 analyzes service traffic and applies policies based upon the analysis. The TDF 170 may gate, shape, or redirect the detected traffic based upon the applied policies. The TDF 170 may receive policy information from the PCRN 136 using the Sd DIAMETER application. The PCRN 136 may create an Sd session to apply the traffic detections policies. Further, the TDF 170 may send traffic detection reports to the NAS 160. Further, the TDF 170 may connect to the packet data network 140 that might provide, for example, internet access or connectivity to other communication networks.

Figure 2:
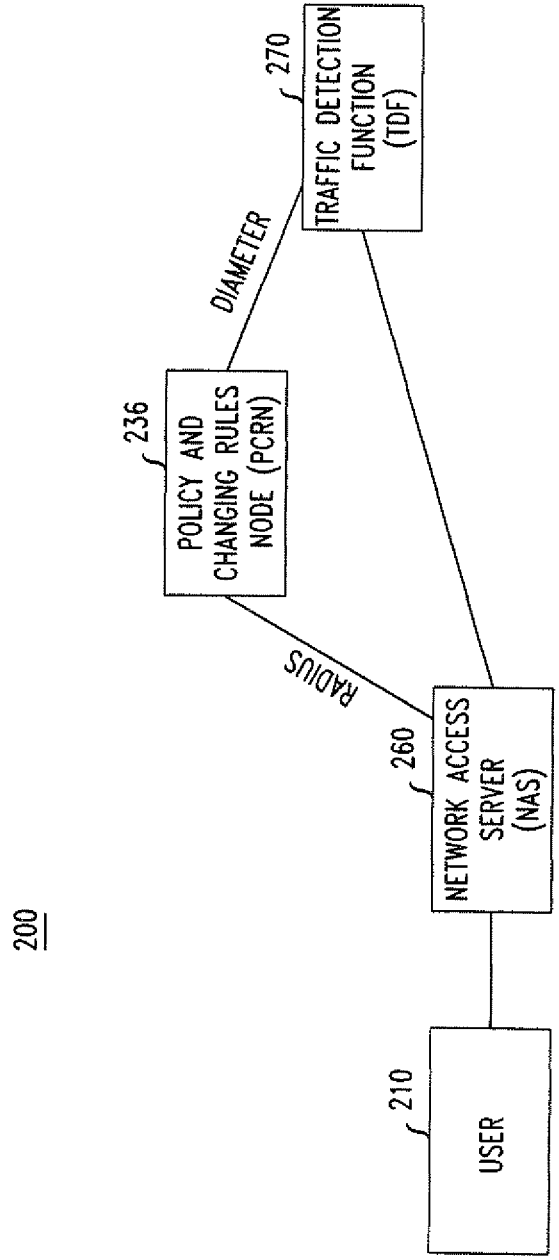
FIG. 2 illustrates the interaction between a PCRN, a NAS, and a TDF.

FIG. 2 illustrates the interaction between a PCRN, a NAS, and a TDF. A PCRN 236 may be the same as the PCRN 136 in FIG. 1, the NAS 260 may be the same as the NAS 160 in FIG. 1, and the TDF 270 may be the same as the TDF 270 in FIG. 1. When a subscriber 210 connects to the NAS 260 to request services, a RADIUS session may be created and associated with the subscriber 210. The subscriber requested services may require the use of traffic monitoring using the TDF 260. The PCRN 236 includes a rule engine as described above to provide various control policies in the network. Specifically, the PCRN 236 may use application detection and control (ADC) rules installed at the TDF 270 in order to monitor service traffic. The PCRN 236 may communicate the ADC rules to the TDF 260 using the Sd application of the DIAMETER protocol and may initiate an associated Sd session. This Sd session is typically bound to an IPCAN session, but when the Sd session is associated with a user accessing the network using the NAS 260, the Sd session may be bound to the subscriber. Once the Sd session is bound to a subscriber, policy changes may be initiated by the NAS 260 by sending a RADIUS message to the PCRN 236. The PCRN 236 may evaluate the RADIUS message using the rule engine and determine any policy changes that may be needed in response to the RADIUS message. The PCRN 236 may push updated policies to both the NAS 260 and TDF 270. This operation will be described below showing the messages exchanged.

The monitoring of the traffic by the TDF 260 may be specified using application detection and control (ADC) rules. ADC rules apply the detection and enforcement actions for the specified application traffic. In systems including both wireless and wireline elements, the powerful rule engine of the PCRN 236 may be used to assign ADC rules to TDFs 260 based upon requests received from NASs 270. The NAS may use an accounting request (ACR) start message to request that traffic be monitored. The rule engine in the PCRN 236 may be used to apply rules to determine which TDF to select to monitor the traffic and what specific ADC rules to provision to the selected TDF.

Figure 3:
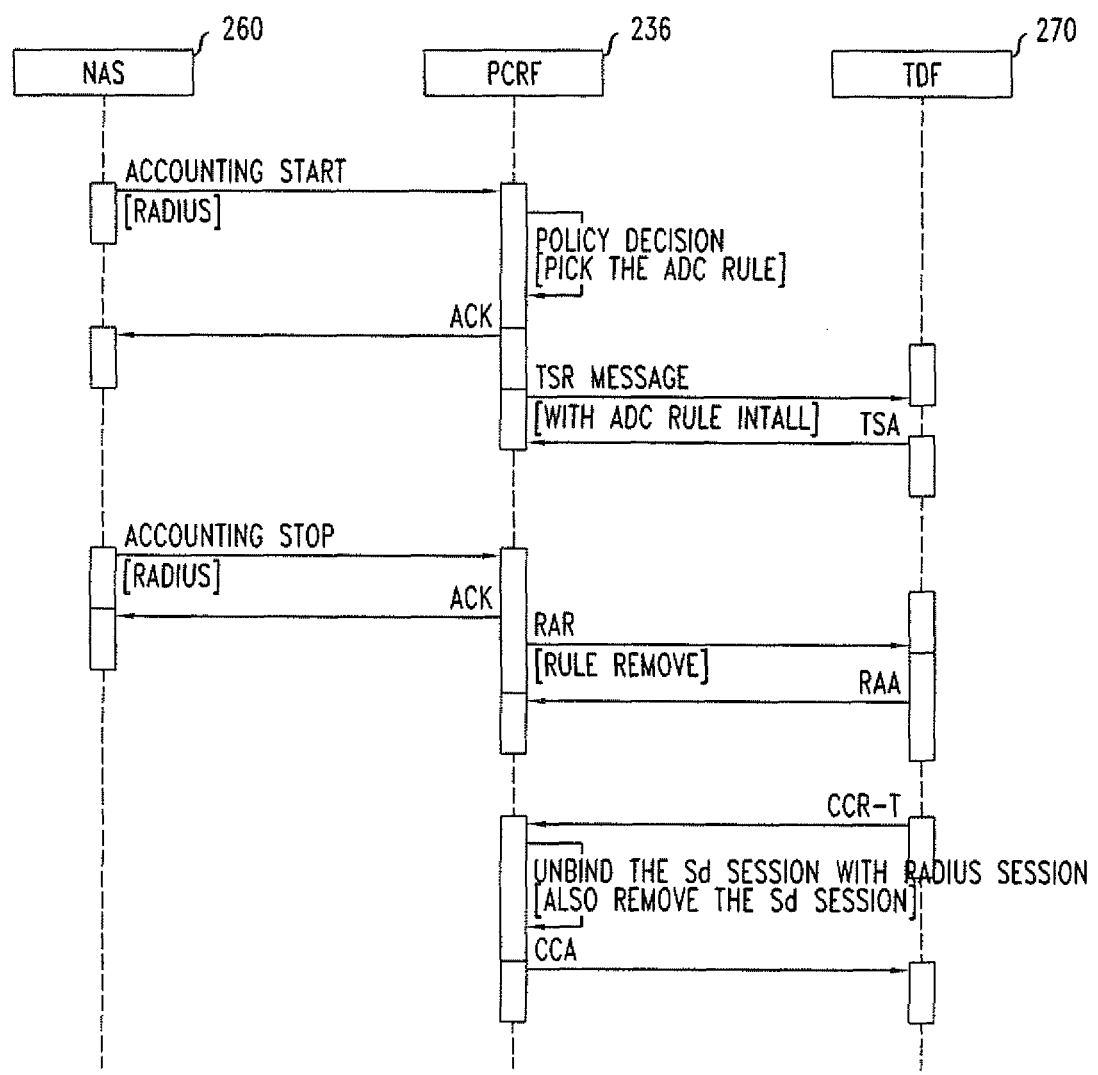
FIG. 3 illustrates the flow of messages in order to bind an Sd session to a subscriber.

FIG. 3 illustrates the flow of messages in order to bind an Sd session to a subscriber. The NAS 260 may send an accounting request start (ACR-Start) message to the PCRF 236 including information that may be in the form of attribute-value pairs (AVP). The PCRF may initiate a NASSession based upon the ACR-Start message. Next, the PCRF may apply rules to information received in the ACR-Start message (e.g., IP address, port id, region code, user or customer specified data, etc.) as well as based upon NASSession information (e.g., IP address, subscriber information, etc.) to determine which ADC rules need to be applied and to which TDFs 260 the ADC rules apply. The PCRF 236 may send an ACR acknowledge message back to the NAS 260. Then the PCRN 236 may initiate an Sd session by sending a TDF session request (TSR) message to the TDF 270. The TSR message may include ADC rules to be installed on the TDF 270 to monitor service traffic. Going forward TDF 270 may send reports to either the PCRF 236 or the NAS 270 regarding the monitored traffic. TDF 270 may respond with a TDF session acknowledge (TSA) message. During the establishment of the Sd session, the PCRN 236 may also bind the Sd session to the subscriber and its associated RADIUS session associated with the RADIUS ACR message. This binding allows for the NAS 260 to send RADIUS messages to the PCRN 236 that will then send policy updates to both the TDF 270 and the NAS 260.

Next, the NAS may send an ACR-Stop message to indicate subscriber has disconnected from the network. The PCRN 236 may acknowledge the ACR-Stop message. The PCRF 236 may apply rules to the ACR-Stop message to determine the specific ADC rules to terminate and which TDFs have ADC rules installed. The PCRF 236 may then send RAR rule remove message to the determined TDFs to terminate the specified ADC rules.

Once the ADC rules are removed, the TDF 270 may send a CCR termination (CCR-T) message to the PCRN indicating that the ADC rules have been removed. The PCRN 236 may then unbind the Sd session from the RADIUS session or subscriber and then remove the Sd session. The PCRN 236 may also send a CCA message to the TDF acknowledging the CCR-T message.

The method illustrated in FIG. 3 may be carried out by the PCRN 236, NAS 260, and the TDF 270. This method may allow for policy update or other RADIUS messages from the NAS to effect changes in the policies implemented on the TDF 270 because the PCRN 236 binds the Sd session to a RADIUS session associated with a subscriber.

It should be apparent from the foregoing description that various exemplary embodiments of the invention may be implemented in hardware and/or software instructions enacted on a processor. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a policy and charging rules node (PCRN), the method comprising:
   receiving a RADIUS accounting request (ACR) start message from a network access server (NAS);
   establishing a RADIUS session with the NAS;
   applying rules by a rules engine to information in the ACR start message to determine a traffic detection function (TDF) to be updated;
   establishing a Sd session with the TDF; and
   binding the Sd session to the RADIUS session.

2. The method of claim 1, further comprising:
   determining application detection and control (ADC) rules to be applied to the TDF; and
   transmitting the determined ADC rules to the determined TDF.

3. The method of claim 2, wherein the determined TDF installs the determined ADC rules.

4. The method of claim 1, further comprising:
   receiving a RADIUS ACR stop message associated with the received ACR start message;
   applying the rules by the rules engine to information in the ACR stop message to determine a traffic detection function (TDF) to be updated; and
   transmitting a terminate message to remove the determined ADC rules on the determined TDF.

5. The method of claim 4, wherein the determined TDF uninstalls the determined ADC rules.

6. The method of claim 1, further comprising:
   unbinding the Sd session and the RADIUS session; and
   terminating the Sd session.

7. The method of claim 6, further comprising terminating the RADIUS session.

8. The method of claim 1, further comprising:
   receiving an policy update RADIUS message from the NAS;
   applying rules by a rules engine to information in the update RADIUS message to determine a policy update for a traffic detection function (TDF); and
   sending a DIAMETER policy update message to the TDF.

9. The method of claim 1, wherein the RADIUS session is associated with a specific subscriber.

10. The method of claim 1, wherein the applied rules include logical instructions applied to an attribute-value pair (AVP) in the information in the ACR start message.

11. A non-transitory computer-readable storage medium encoded with instructions executable by a processor in a charging rules node (PCRN), the non-transitory computer readable storage medium comprising:
    instructions for receiving a RADIUS accounting request (ACR) start message from a network access server (NAS);
    instructions for establishing a RADIUS session with the NAS;
    instructions for applying rules by a rules engine to information in the ACR start message to determine a traffic detection function (TDF) to be updated;
    instructions for establishing a Sd session with the TDF; and
    instructions for binding the Sd session to the RADIUS session.

12. The non-transitory computer-readable storage medium of claim 11, further comprising:
    instructions for determining application detection and control (ADC) rules to be applied to the TDF; and
    instructions for transmitting the determined ADC rules to the determined TDF.

13. The non-transitory computer-readable storage medium of claim 11, further comprising:
    instructions for receiving a RADIUS ACR stop message associated with the received ACR start message;
    instructions for applying the rules by the rules engine to information in the ACR stop message to determine a traffic detection function (TDF) to be updated; and
    instructions for transmitting a terminate message to remove the determined ADC rules on the determined TDF.

14. The non-transitory computer-readable storage medium of claim 11, further comprising:
    instructions for unbinding the Sd session and the RADIUS session; and
    instructions for terminating the Sd session.

15. The non-transitory computer-readable storage medium of claim 14, further comprising terminating the RADIUS session.

16. The non-transitory computer-readable storage medium of claim 11, further comprising:
    instructions for receiving an policy update RADIUS message from the NAS;
    instructions for applying rules by a rules engine to information in the update RADIUS message to determine a policy update for a traffic detection function (TDF); and
    instructions for sending a DIAMETER policy update message to the TDF.

17. The non-transitory computer-readable storage medium of claim 11, wherein the RADIUS session is associated with a specific subscriber.

18. The non-transitory computer-readable storage medium of claim 11, wherein the applied rules include logical instructions applied to an attribute-value pair (AVP) in the information in the ACR start message.

* * * * *